Nov. 16, 1937.  F. PORSCHE  2,099,312
SPRING SUSPENSION OF INDEPENDENT CAR WHEELS, ESPECIALLY FOR MOTOR VEHICLES
Filed Jan. 25, 1932    3 Sheets-Sheet 1
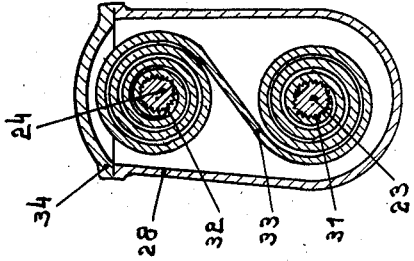
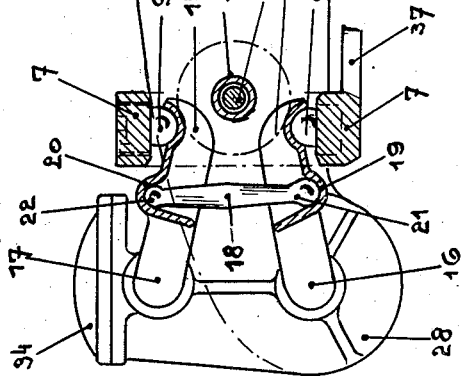
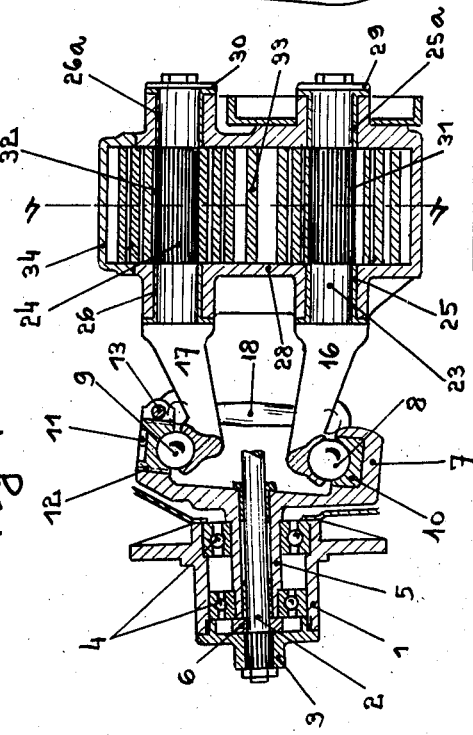
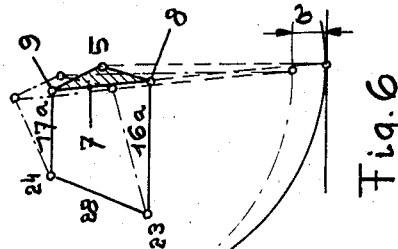
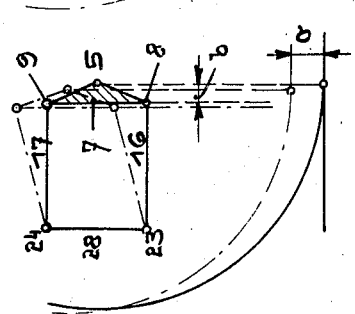
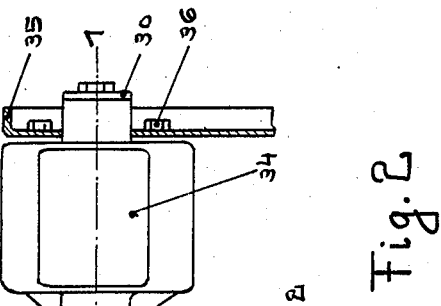
Inventor:

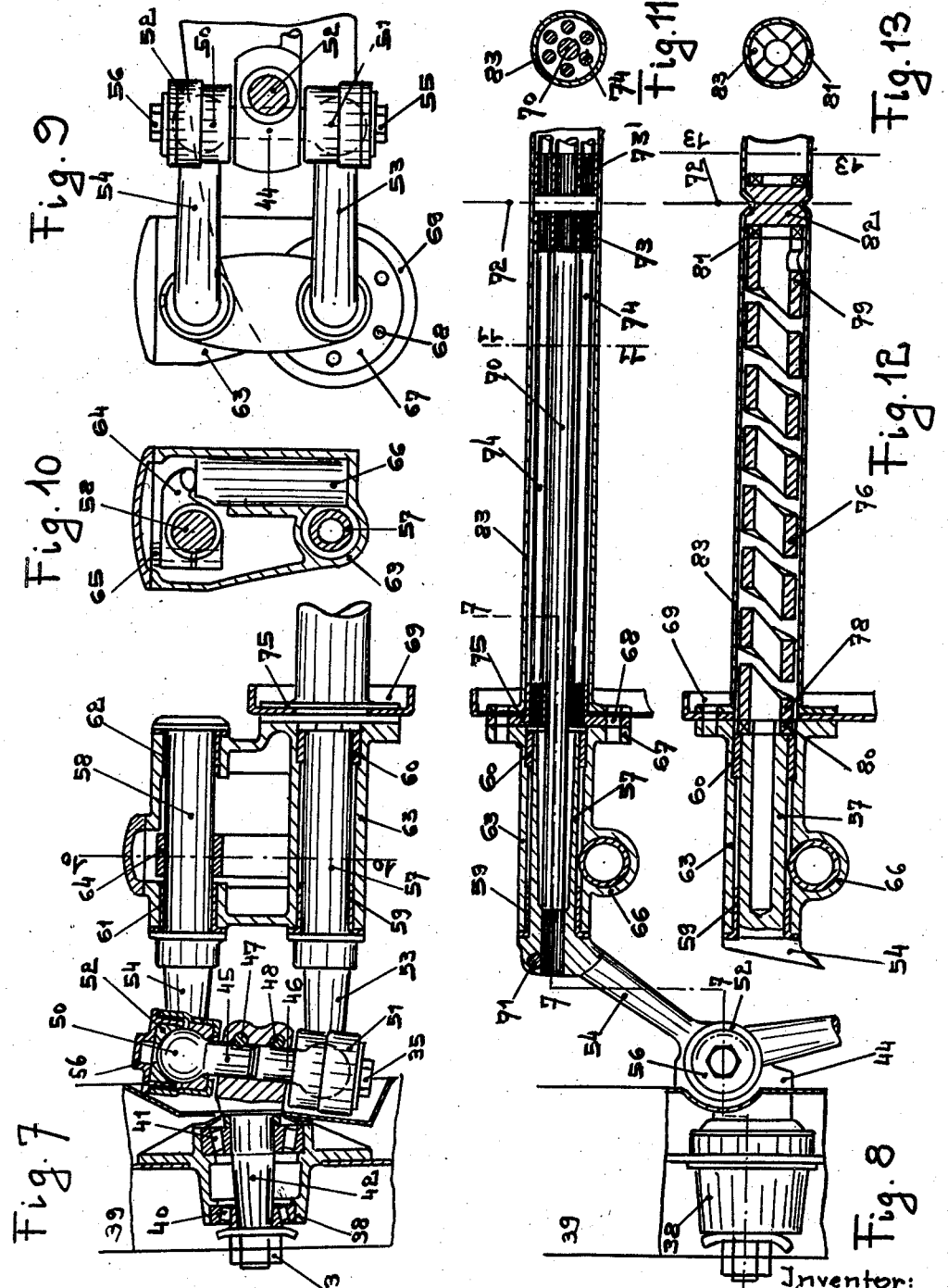

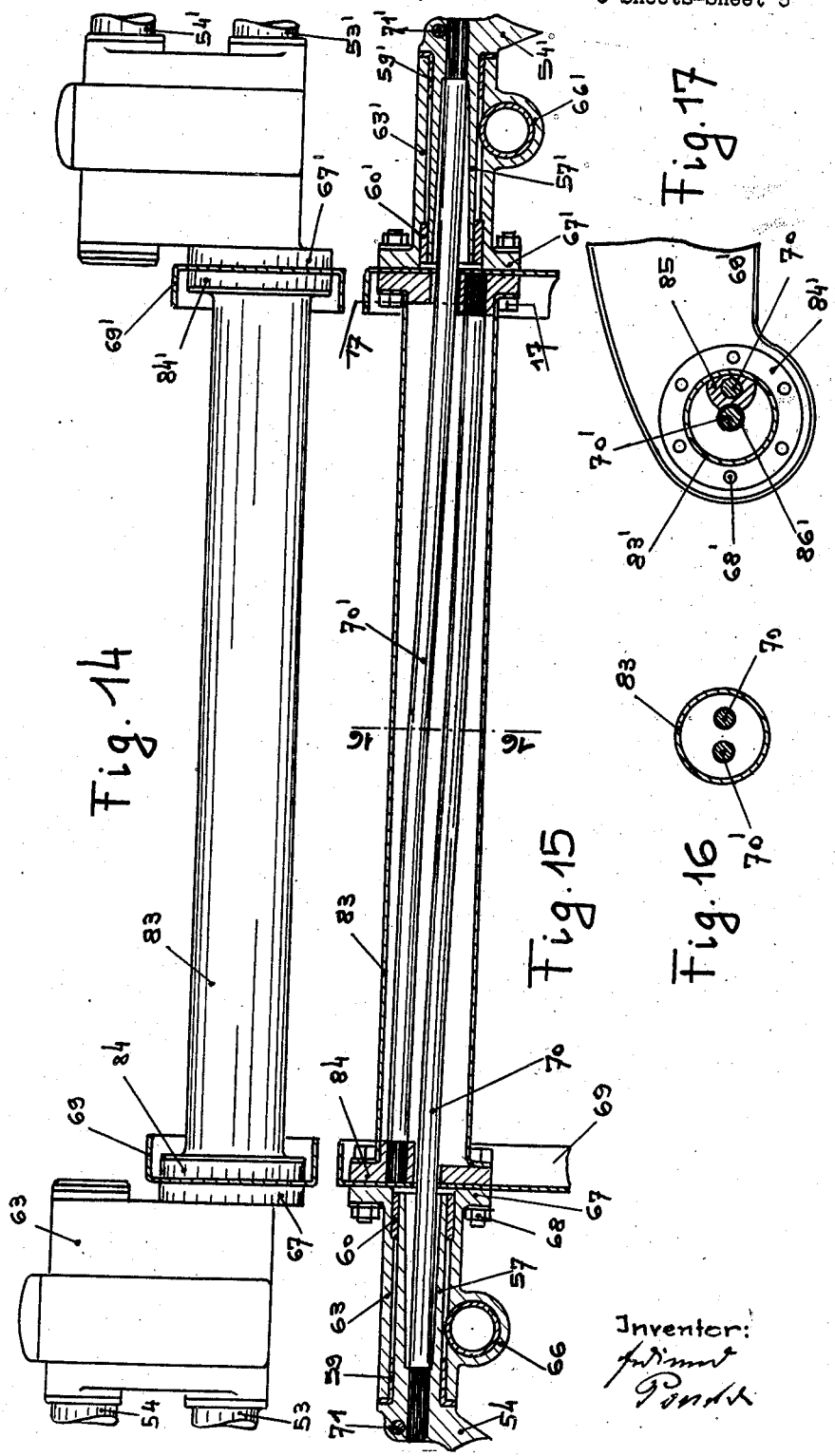

Patented Nov. 16, 1937

2,099,312

UNITED STATES PATENT OFFICE 2,099,312

SPRING SUSPENSION OF INDEPENDENT CAR WHEELS, ESPECIALLY FOR MOTOR VEHICLES

Ferdinand Porsche, Stuttgart, Germany

Application January 25, 1932, Serial No. 588,719
In Germany August 10, 1931

5 Claims. (Cl. 280—124)

The invention consists in the suspension of the car wheels by means of a so-called joint square. This is done by means of two supporting levers seated in the frame, having a swinging motion in the direction of the car, and connected with the wheel by two ball joints. Owing to this arrangement the braking and driving moments of reaction of the wheels are compensated for by two forces in the same and opposite direction, acting in the supporting levers but causing no influence on the spring. In consequence of the formation of the two ball joints at the wheel not only the latter can follow the swinging motion of the supporting levers, but at the same time it is also possible to swing the wheel around the connecting line of the two ball joints. Therefore the arrangement is especially suitable for steering wheels and involves a plain, cheap and space-saving construction. It is immaterial whether freely-running or driven steering wheels are employed, since there is enough room between the ball joints to lead the driving shaft therethrough. Therefore, the invention concerns all types of car wheels.

The invention also consists in the direct connection of the supporting lever pins with the elastic and shock-absorbing elements, so that each wheel, independently of the other, can move on springs. It is possible to arrange springs where both supporting levers are connected with the elastic elements, so that the reaction effects of the two supporting levers may be balanced. Other arrangements are possible, such as where one of the supporting levers is connected with the elastic elements and the other with the shock-absorbing elements. In this case the reaction effects of the elastic elements must be transferred to the frame, and the latter must be kept sufficiently rigid. This is carried out by means of a stiffening pipe connecting the ends of the frame with each other and which may also serve to enclose the elastic elements.

According to the invention the usual plate springs are replaced by spiral or screw-shaped bending-springs or torsional and elastic bars lying crosswise relative to the car. Besides, the better overall efficiency which these types of springs possess in comparison with the usual plate springs with their considerable internal friction, presents another advantage, that is, that they are extremely compendious and therefore may be easily placed in the casing of a bearing for the supporting lever pins or in the above-mentioned stiffening tube of the frame, whereby they are protected from the detrimental influence of the weather and dust and dirt.

In the drawings several examples of the invention are illustrated, and are shown as applied to the left-hand front steering wheel of a motor vehicle:

Fig. 1 is a combined longitudinal section taken on line 1—1 of Fig. 2 through the hub of a driven steering wheel and its suspension on the frame (crosswise to the direction of the vehicle);

Fig. 2 is a plan view of the construction according to Fig. 1;

Fig. 3 is a side elevation of Fig. 1 with parts in section;

Fig. 4 is a longitudinal section taken on line 4—4 of Fig. 1;

Fig. 5 is a diagrammatic view illustrating the hinged parallelogram in accordance with Figs. 1 to 4;

Fig. 6 is a diagrammatic view illustrating a hinged square as a modification of the arrangement according to Fig. 5;

Fig. 7 is a combined longitudinal section taken on line 7—7 of Fig. 8 through the hub of an ordinary steering wheel and its suspension on the frame (crosswise to the direction of the vehicle);

Fig. 8 is a plan view partly in section of the construction of Fig. 7;

Fig. 9 is a side view of a part of the construction of Fig. 7;

Fig. 10 is a longitudinal section taken on line 10—10 of Fig. 7;

Fig. 11 is a longitudinal section taken on line 11—11 of Fig. 8;

Fig. 12 is a sectional view of a modified form of the construction of Fig. 8;

Fig. 13 is a longitudinal section taken on line 13—13 of Fig. 12;

Fig. 14 is a side view in the direction of the vehicle of the bearings of the two steering wheels in accordance with Figs. 7 to 13;

Fig. 15 is a sectional view of a third modification of the constructions according to Figs. 8 and 12;

Fig. 16 is a longitudinal section taken on line 16—16 of Fig. 15; and

Fig. 17 is a longitudinal section taken on line 17—17 of Fig. 15 in the side elevation.

In the example of execution illustrated in Figs. 1 to 6 the wheel hub 1 is connected with the driving shaft 2 by means of the coupling piece 3. The hollow stump 5 of the axle is seated in the wheel hub 1 by means of the two ball bearings 4 and secured by the nut 6 against the hub 1. At the other end (inside of the wheel) the stump 5 of the axle has the form of a fork 7 in which there are two balls 8 and 9 in the respective sockets 10 and 11. The upper socket 11 is adjustable by means of the thread 12 and secured by a clamping-screw 13. The counter-sockets 14 and 15 for the balls 8 and 9 respectively are provided in the supporting levers 16 and 17, which rest on a connecting rod 18 whose ends 21 and 22 are spherical and seat in the corresponding sockets 19 and 20 of the supporting levers 16 and 17 respectively. The bolt-shaped ends or shafts 23 and 24 of the supporting levers are doubly seated in the spring case 28 by means of the bushes 25, 25a and 26, 26a, and are maintained in their positions by the discs 29 and 30. Between the bearing points 25, 25a and 26, 26a, the bolts 23 and 24 are connected, by means of the channel sections 31 and 32 respectively, with the eyes of the flexible spring 33 which surrounds the bolts in spiral formation as shown in Fig. 4.

The spring case 28 is rendered accessible by a cap 34 screwed on the fist-shaped end of the frame 35, for instance by means of the bolts 36. The steering lever 37 is firmly connected with the axle fork 7.

If the wheel is springy, both supporting levers 16 and 17 swing through to each other, whereby the flexible-spring 33 connected with them is tensioned, without transferring any reaction effects to the frame. The spring case 28 is filled with grease which is pressed out in the direction of the intermediate spiral spaces and acts as a damping of the spring motion, for the reason that the edges of the spring 33 close with the wall of the casing. In order to make sure that the supporting levers 16 and 17 are adjusted as far as possible without any play, the socket 11 provided with thread 12 can be regulated at will. The steering of the wheel 2 is effected around the axle illustrated by the connecting line of the ball centre 8 and 9, in the usual way by means of the steering lever 37.

When the springing of the wheel takes place for a distance a, as illustrated in Fig. 5, the steering axle is shifted parallel to itself. Its piercing point with the bottom remains a distance to the extent b from the bearing point of the wheel, which sometimes causes difficulties in steering. This disadvantage is avoided by the formation of the steering square according to Fig. 6. Here the steering axle passes exactly through the bearing point of the wheel and participates in a small forward rotation, as soon as the wheel is springing. Also in this new position the steering axle passes through the bearing point of the wheel so that the steering can be easily handled for all positions of the wheel.

In the examples of execution illustrated in Figs. 7 to 13, the wheel hub 38 is connected in the usual way with the wheel body 39. By means of the roller bearings 40 and 41 the axle-stump 42 is seated in the hub and maintained by the nut 43. At the other end (inside of the wheel) the axle stump 42 has the form of a fist 44 in which a divided axle bolt 45 and 46 is fixed by means of the clamping-screws 47 and 48. The ends 49 and 50 of the axle bolt 45 and 46 respectively are spherical and seated in corresponding bearings 51 and 52 at the supporting levers 53 and 54. These bearings 51 and 52 respectively can be adjusted and regulated by means of the caps 55 and 56. The bolt-shaped ends 57 and 58 of the supporting levers 53 and 54 are doubly seated in the shock-absorbing case 63 by means of the bushes 59, 60 and 61, 62 respectively. The upper bolt 58 bears a lever 64 fixed by means of the screw 65 and which drives with each swinging motion of the bolt 58 a shock absorbing piston of known construction and whose cylinder pipe 66 is indicated. The shock-absorber casing 63 is firmly connected with the frame fist 69 by means of the flange 67 and the screw 68.

In the example of execution illustrated in Figs. 7 to 10 the lower bolt 57 is hollow. Its outer end (on the side of the wheel) is firmly connected with the bar-shaped torsion-spring 70 lying in the centre and is secured against displacement by means of the pin 71. The torsion spring 70 lies within a tube 83 intended to stiffen the frame, approximately to the middle of car 72, where it is firmly connected with the cylindrical intermediate piece 73 freely movable within the pipe 83. A certain number of other bar-shaped torsion-springs 74 surround the central spring 70 like a wreath, with utmost utilization of the inner space of the pipe, so that the outer springs 74 are fixed, on the one hand, in the intermediate piece 73, and on the other hand in a flange piece 75 which is screwed on the latter between the frame-fist 69 and the flange 67 of the shock-absorber casing 63.

The connection between the bar-shaped springs 70 and 74 and the bolt 57 or the intermediate piece 73 or the flange piece 75 is effected by channel sections. The steering takes place in the manner indicated in the foregoing example.

The torsion springs 70 and 74 may be replaced by the cylindrical flexion spring 76 illustrated in Figs. 12 and 13, and which is provided in the interior of the pipe 83. The spring possesses a rectangular section and is suitably cut of a pipe whose ends 78 and 79 form closed bushes in which the claws 80 and 81 are milled. By means of the claws 80 and 81 the flexion spring 76 is connected with corresponding counter-claws of the bolt 57, on the one hand, and of the intermediate piece 82 firmly tightened up with the pipe 83, which guarantees an easy regulation and adjustment.

If the wheel swings through, for instance to the top, the bolt 57 joins in swinging and tightens the spring (either the torsion springs 71 and 74 or the flexion spring 76), whilst at the same time the bolt 58 drives by its swinging motion the hydraulic shock-absorber by means of the lever 64. The torsion spring acts in such a manner that the turning moment is introduced into the central spring 70 and transferred through the intermediate piece 73 to the outer spring 74 and over the flange piece 75 to the frame 69. The flexion spring 76 acts in such a way that the introduced turning moment is transferred to the intermediate piece 82 and thereby to the torsion proof pipe 83.

In the example of execution illustrated in Figs. 14 to 17 the steering wheels are seated in the manner illustrated in Figs. 7 to 13. Their absorption by springs, however, takes place by means of two single torsion springs 70 and 70' respectively. The bar 70 is fastened on the one hand to the end of the supporting lever pin 57 exactly as before (side of the wheel), and on the other hand in a flange piece 84' which is screwed (68') on the frame fist of the opposite cross beam 69'.

In order that the bars 70 and 70' can pass each other, their fixing points 85' and 85 are lying eccentrically to the axle of the supporting lever pins 57 and 57' respectively, in a horizontal plane, so that the point of passage of the bar 70' through the flange piece 84' lies by the side of the fixing point 85' of the other bar 70 in the flange piece 84'. Between the flange pieces 84 and 84' lies the stiffening tube 83 in which the bars 70 and 70' are placed invisible from outside.

If for instance the wheel 39 is swinging through to the top, a turning moment is introduced into the torsion spring 70 exactly as in the foregoing example of execution, but the reaction acts now in the opposite cross beam 69', whilst the shock-absorber 66 is handled exactly as before. In consequence of the eccentricity of its fixing-points, the torsion bar will get bent but owing to this arrangement so much has been gained in length of spring and thereby in useful volume of spring, as can be found by a single torsion spring per wheel.

The invention is not limited to the illustrated examples of execution. For instance the torsion bars can be replaced by torsion tubes; instead of fastening the torsion springs by means of grooves, the fixing can be effected also by means of flanges or claws; combinations of torsion and flexion springs are possible, for instance a central torsion spring surrounded by a screw-shaped flexion spring. Moreover, parts and particular features of this invention can be employed for the spring suspension of wheels by means of hinged parallelograms swinging crosswise to the direction of the route or of single supporting levers swinging in the direction of the route.

Having now particularly described and ascertained the nature of said invention, and in what manner the same is to be performed, I declare that what I claim is:

1. A wheel suspension particularly for motor cars, comprising a vertical member on which the wheel is mounted, a pair of supporting levers forming a four jointed link motion device with the member guiding it for oscillation in rigidly determined planes and having one end of each of the levers connected with invariable spacing of joints to one end of the member, a shaft secured at the other end of each of the levers, a single metallic spring secured to each of the shafts, and means for mounting said shafts with invariable spacing of axes on a frame of the car whereby the wheel will be elastically mounted relative to the frame, said spring being continuous and spirally coiled around each shaft and one end is secured to each shaft.

2. A wheel suspension particularly for motor cars, comprising a vertical member on which the wheel is mounted, a pair of supporting levers forming a four jointed link motion device with the member guiding it for oscillation in rigidly determined planes and having one end of each of the levers connected with invariable spacing of joints to one end of the member, a shaft secured at the other end of each of the levers, a single metallic spring secured to each of the shafts, and means for mounting said shafts with invariable spacing of axes on a frame of the car whereby the wheel will be elastically mounted relative to the frame, said spring being continuous and spirally wound around each shaft and one end is secured to each shaft by means of a knurled spring eye.

3. A wheel suspension particularly for motor cars, comprising a vertical member on which the wheel is mounted, a pair of supporting levers forming a four jointed link motion device with the member guiding it for oscillation in rigidly determined planes and having one end of each of the levers connected with invariable spacing of joints to one end of the member, a shaft secured at the other end of each of the levers, a single metallic spring secured to each of the shafts, and means for mounting said shafts with invariable spacing of axes on a frame of the car whereby the wheel will be elastically mounted relative to the frame, said means including a housing for the spring having small clearance for the spring and which is adapted to be filled with a thick liquid.

4. In an independent wheel suspension especially for motor vehicles having a frame in which the wheel swings on an articulated parallelogram system having pivots and torsion resisting means connected to at least one of its pivots, an axle stub on which the wheel is mounted, two rigid links each having a ball joint at the ends thereof pressed against corresponding surfaces of the axle stub in such a manner as to permit steering movements of the wheel, a bar interposed between said links, a pivot on each link, and rigid bearings on the frame for the pivots for suspension movements of the wheel and links.

5. In an independent wheel suspension especially for motor vehicles having a frame in which the wheel swings on an articulated parallelogram system having pivots and torsion resisting means connected to at least one of its pivots, a stub axle upon which said wheel is mounted, two rigid links each having ball joint ends pressed against corresponding surfaces of said axle stub, said links having ball cups between which balls are interposed to form the ball joints, whereby steering movements of the wheel are permitted, a bar interposed between said links, a pivot on each link, and rigid bearings on the frame for the pivots for suspension movements of the wheel and links.

FERDINAND PORSCHE.